Dec. 29, 1970   P. M. WILSON   3,551,075
SOOT BLOWERS

Filed Jan. 21, 1969   5 Sheets-Sheet 1

Inventor
PETER M. WILSON
By Young & Thompson
Attorneys

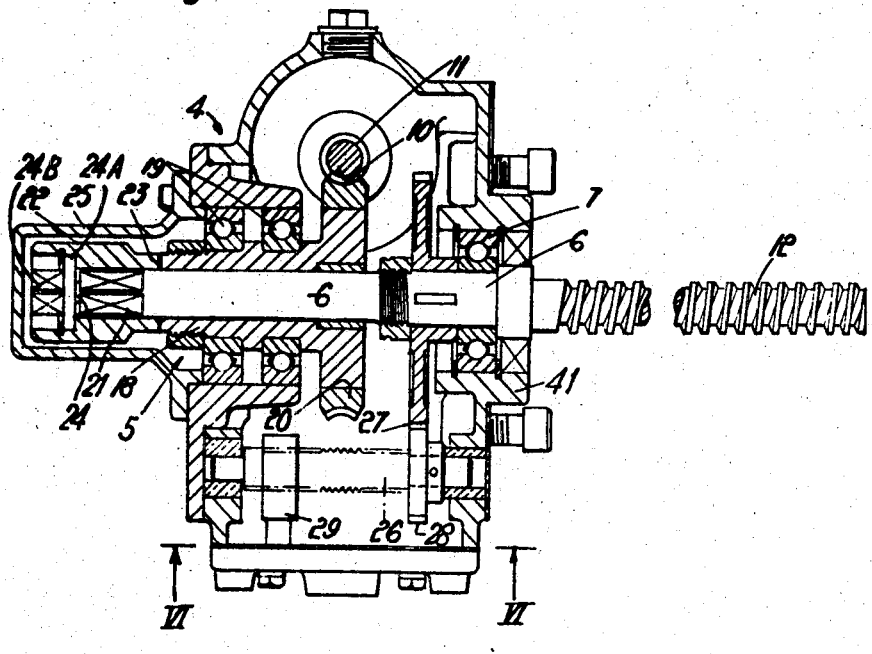

United States Patent Office 3,551,075
Patented Dec. 29, 1970

3,551,075
SOOT BLOWERS
Peter M. Wilson, Clydebank, Scotland, assignor to Clyde Blowers Limited, Clydebank, Scotland, a British company
Filed Jan. 21, 1969, Ser. No. 792,690
Int. Cl. F04f 5/16, 5/48
U.S. Cl. 417—182                    10 Claims

ABSTRACT OF THE DISCLOSURE

A soot blower wherein the driving motor is mounted on the outer end of the casing extension and providing a short and simple coupling between the motor and the closely adjacent driving spindle. The short coupling is preferably in the form of a toothed clutch surrounding the driving spindle and disengageable to expose the spindle end for manual rotation.

---

This invention relates to soot blowers, and more particularly to a soot blower of a kind including an elongated casing, a soot blower steam spindle mounted in the casing for reciprocation between an advanced (inner) position and a withdrawn (outer) position and connectible to a source of pressurized blowing medium, an elongated housing end-to-end with the steam spindle casing to form an outward extension thereof, and steam spindle driving mechanism in the housing and including a rotary driving spindle disposed at the outer end of the housing and drivingly connected to a reversible motor.

Usually, the motor together with reversing means therefor drivingly connected thereto are mounted on a box structure surrounding the casing/steam spindle assembly, and the driving connection between the motor and the rotary driving spindle consists of a shaft extending outwards from the motor and parallel to the driving spindle, and suitable gearing between the outer ends of the shaft and driving spindle; and to enable manual operation of the steam spindle, the shaft embodies a releasable coupling, and the outer end of the driving spindle is engageable by a hand wheel.

The object of the present invention is to provide simple, compact and inexpensive steam spindle operating means for a soot blower of the aforesaid kind.

According to the present invention a soot blower comprises an elongated casing, a soot blower steam spindle mounted in the casing for reciprocation between an advanced (inner) position and a withdrawn (outer) position and connectible to a source of pressurized blowing medium, and steam spindle operating means composed of an elongated housing end-to-end with the steam spindle casing to form an outward extension thereof, driving mechanism in the housing including a rotary driving spindle in the outer portion of the housing, and a reversible motor on the outer portion of the housing and drivingly connected to the driving spindle.

Preferably the driving mechanism includes a rotary sleeve accommodating the rotary driving spindle, a driving connection between the motor and the rotary sleeve, a collar keyed to the outer end of the driving spindle, and interengaging clutch formations on opposed ends of the collar and sleeve, the collar being slidingly removable from the spindle end to disengage the clutch formations and enable manual driving of the spindle end.

Preferably also said housing supports at the driving spindle's inner end a bearing carrying the driving spindle, and supports at the driving spindle's outer end a bearing carrying the rotary sleeve.

An embodiment of the present invention will now be described by way of example with reference to the accompanying drawing in which:

FIG. 5 is a sectional top plan view on the line V—V of FIG. 4; and

FIG. 6 is a side view on the line VI—VI of FIG. 5.

Figure 1:
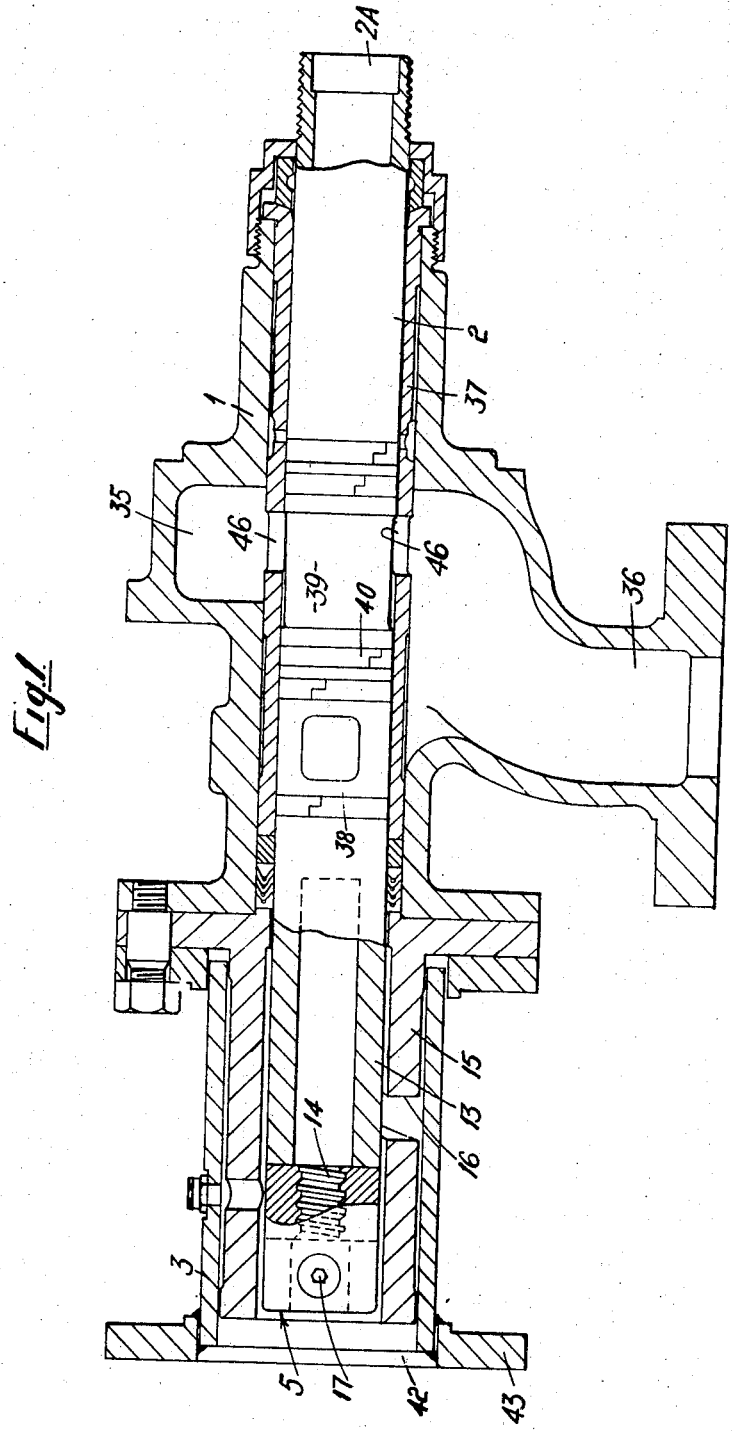
FIG. 1 is a fragmentary sectional elevation of the casing/nozzle-tube assembly of a soot blower.
Figure 2:
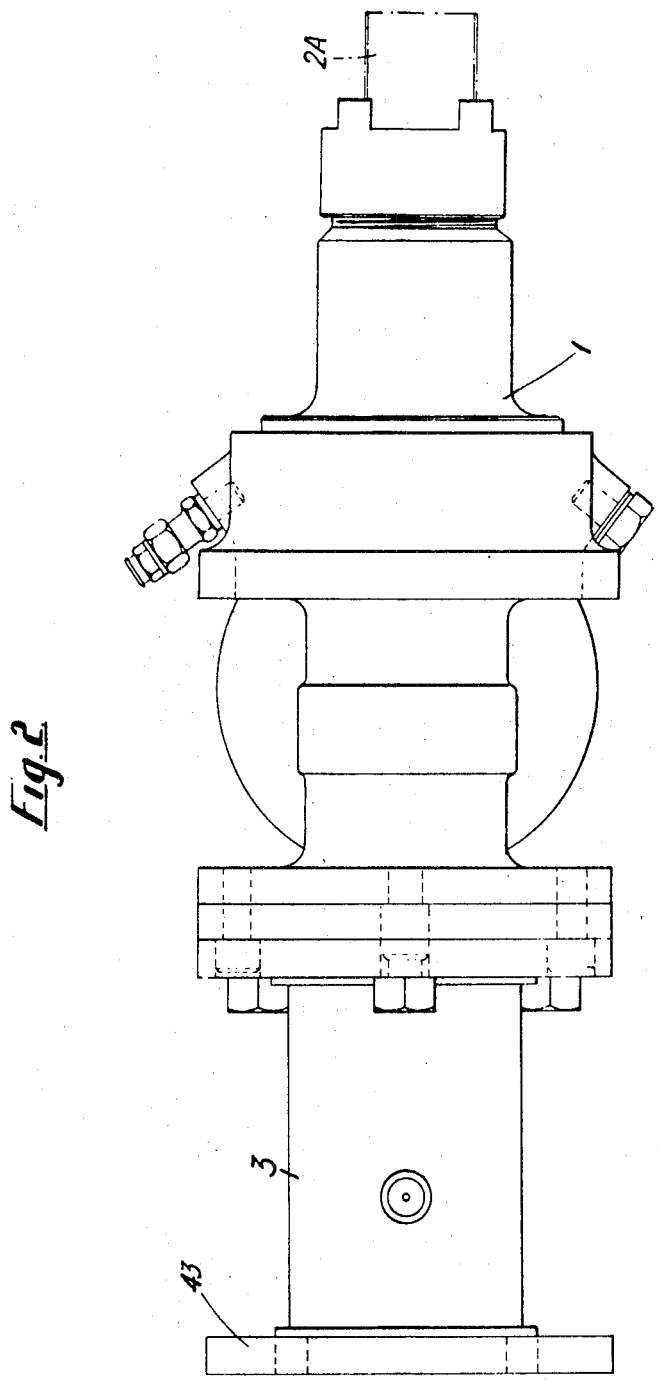
FIG. 2 is a top plan view of the assembly of FIG. 1.
Figure 3:
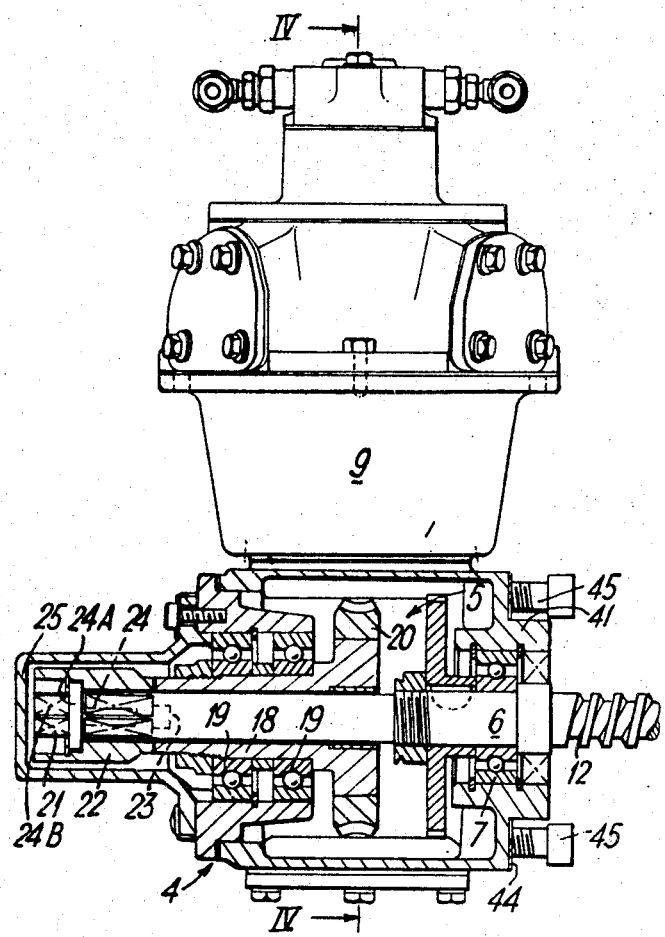
FIG. 3 is a part-sectional side view of the outer end portion of the operating means for the nozzle tube of FIG. 1.
Figure 4:
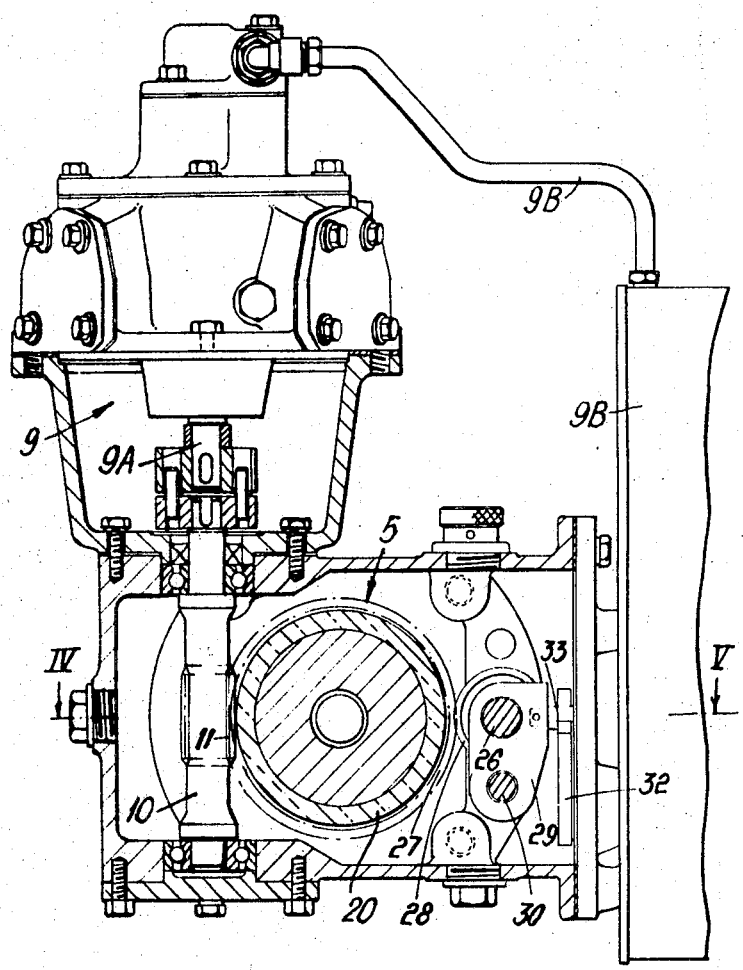
FIG. 4 is a part-sectional end view on the line IV—IV of FIG. 3.

Referring to the drawings, a soot blower includes an elongated, generally cylindrical casing 1, an elongated steam spindle in the form of a nozzle tube 2 mounted in the casing for combined rotary and axial movement between an advanced (inner) position and withdrawn (outer) position, a discharge nozzle (not shown) on the leading end 2A of a nozzle tube 2, and nozzle-tube operating means including an elongated housing composed of inner and outer portions 3 and 4 and disposed end-to-end with the casing 1 to form an outward extension thereof, driving mechanism 5 in the composite housing including a rotary driving spindle 6 in the outer portion 4 of the housing, and a motor 9 on the outer portion 4 of the housing and drivingly connected to the driving mechanism. The driving spindle 6 is co-axial with the nozzle tube 2 and is carried by a ball bearing 7 supported in the housing portion 4 at the inner end of the spindle 6.

The motor 9 is a reversible air-operated motor and includes reversing means 9B. This motor is mounted on top of the housing portion 4 with the axis of its shaft 9A at right angles to the axis of the spindle 6, while the reversing means 9B are mounted on a side wall of the housing portion 4. The driving mechanism 5 further includes a screw-threaded rod 12 forming an inward co-axial extension of the driving spindle 6 and lying within a tubular outward co-axial extension 13 on the nozzle tube 2, nut 14 fixed within the outer end of the extension 13 and engaged by the rod 12, a skirt 15, helically slotted at 16, fixedly mounted within the housing portion 3, and an external pin 17 on the extension 13 engaging in the helical slot 16, the arrangement being such that rotation of the spindle 6 effects combined axial and rotary movement of the nozzle tube 2 between the advanced and withdrawn positions. The driving mechanism 5 still further includes a rotary sleeve 18 accommodating the spindle 6 and carried by ball bearings 19 mounted in the housing portion 4. The spindle 6 has a squared outer end portion 21 projecting from the sleeve 18 and engaged by a correspondingly squared collar 22 which is thus keyed to the shaft 6. Clutch teeth 23 drivingly connect the inner end of the collar 22 to the outer end of the sleeve 18, and a screw-threaded pin 24 having a flange 24A and squared head 24B engages a tapped hole in the end of the spindle 6 and has its flange abutting a step in the collar 22 to secure the collar on the spindle. Access to the pin 24 is gained by removing a detachable cap 25 forming an outward extension of the housing portion 4. The collar 22 is slidingly removable from the spindle end following removal of the cap 25 and pin 24. A driving connection is provided between the motor 9 and the sleeve 18 and consists of worm reduction gearing whereof the worm 11 is on a shaft 10 mounted at right angles to the sleeve axis and directly coupled to the motor shaft 9A, and the worm wheel 20 is on the sleeve 18. Removal of the collar 22 simultaneously breaks the motor drive to the spindle 6 and exposes the squared end portion 21 for engagement by a suitable crank arm (not shown) so that manual operation of the nozzle tube is readily possible when required. The driving mechanism includes an auxiliary drive from the motor 9 to operate the reversing means 9B for the motor 9. This auxiliary drive includes in the housing portion 4 a screw-threaded countershaft 26 driven by a spindle 6 through toothed-wheel gearing 27 and 28, a nut 29 engaging the countershaft 26 and mounted on a guide rod 30 for reciprocation, a rock shaft 31 at right angles to the countershaft 26 and operatively connected to the reversing means 9B, a slotted rocker arm 32 fixed to the rock shaft 31, and a pin 33 on the nut 29 and engaging the slot 34 in the rocker arm 32. This auxiliary drive is operated by the motor 9 to actuate the reversing means at the end of each stroke of the nozzle tube 2, provision being made for a suitable dwell at the end of each stroke.

The casing 1 (FIG. 1) includes an annular inlet chamber 35 having a branch inlet pipe 36 for pressurized blowing medium, and a ported, cylindrical sleeve 37 fixed within the casing 1 and within which the nozzle tube 2 is slidingly mounted. A ported zone 38 and a waisted closure zone 39 on the nozzle tube are isolated by piston rings 40 and cooperate with ports 46 in the sleeve 37 to admit blowing medium to the nozzle tube 2 when the latter is in advanced position, and to shut off the supply of blowing medium to the nozzle tube when the latter is in withdrawn position.

The housing portions 3 and 4 are detachably interconnected; thus, a spigot end 41 on the portion 4 engages in the adjacent end 42 of the portion 3, and an out-turned flange 43 on the portion 3 abuts a flat, end face 44 of the portion 4 and is clamped to said face by screws 45. With this arrangement, the housing portion 4 with the bulk of the driving mechanism, and the motor 9 with its reversing means together form a unit which is readily detachable from the housing portion 3 by removing the flange screws 45 and unscrewing the rod 12 from the nut 14. Thus, the nozzle-tube operating means are made readily accessible for maintenance and repair.

By transmitting the drive to the driving spindle 6 through the rotary sleeve 18 surrounding and mounted independently of the spindle 6, the need for ensuring correct alignment of spaced bearings for the spindle 6 is avoided.

The soot blower is operated in orthodox manner. By virtue of the invention there is provided a simple, compact and inexpensive soot blower which embodies in unitary manner the reversible motor with its reversing means, is quickly and easily convertible for hand operation, and is readily dismantled for inspection and repair.

In a modification the reversible air-operated motor is replaced by a reversible electrical motor.

I claim:

1. A soot blower comprising an elongated casing; a soot blower steam spindle within the casing and adapted for reciprocation between an advanced inner position wherein the steam spindle extends from the casing and a withdrawn outer position; an inlet duct on the casing for pressurized blowing medium; a port on the wall of the steam spindle communicating with said duct for passage of blowing medium from the duct to the steam spindle; and a drive for effecting said reciprocation of the steam spindle including a rotary driving spindle coaxial with said spindle and rotatably mounted in an outer portion of an elongated housing and drivingly engaging the outer end of the steam spindle, said housing being located at the axially outer end of the casing and forming an axial extension thereof, and a reversible motor on the outer portion of the housing and drivingly connected to said driving spindle, the motor and housing forming a unit.

2. A soot blower according to claim 1, wherein the drive includes a rotary sleeve accommodating the rotary driving spindle, a driving connection between the motor and the rotary sleeve, a collar keyed to the outer end of the driving spindle, and interengaging clutch formations on opposed ends of the collar and sleeve, the collar being slidingly removable from the spindle end to disengage the clutch formations and enable manual driving of the spindle end.

3. A soot blower according to claim 2, wherein the driving connection between the motor and the rotary sleeve includes a shaft disposed at right angles to the rotary sleeve axis, a worm on said shaft, and a worm wheel on the rotary sleeve and meshing with the worm.

4. A soot blower according to claim 3, wherein the motor shaft is directly coupled to the worm shaft.

5. A soot blower according to claim 2, wherein said housing supports at the driving spindle's inner end a bearing carrying the driving spindle, and supports at the driving spindle's outer end a bearing carrying the rotary sleeve.

6. A soot blower according to claim 1, wherein the drive includes a nut carried by the nozzle-tube and disposed in the inner portion of the housing, and a screw-threaded rod forming an inward extension of the driving spindle and engaging the nut.

7. A soot blower according to claim 1, wherein the drive includes a pin and a helical slot interengaging to form a connection between the steam spindle and the inner portion of the housing so that the steam spindle is given a combined axial and rotary movement between advanced and withdrawn positions.

8. A soot blower according to claim 1, wherein the motor has reversing means therefor on the outer portion of the housing and drivingly connected to the motor, and the driving mechanism includes an auxiliary drive in the outer portion of the housing and operatively connecting the driving spindle with the reversing means.

9. A soot blower according to claim 8, wherein the auxiliary drive includes a rock shaft extending between the housing's outer portion and the reversing means, a slotted rocker arm extending upwards into the housing from the rock shaft, a rotary screw-threaded countershaft mounted alongside the driving spindle and geared thereto, a nut on the countershaft, and on the nut a pin engaging in the slot of the rocker arm.

10. A soot blower according to claim 8, wherein the housing's inner and outer portions are detachably interconnected.

References Cited

UNITED STATES PATENTS

| | | | |
|---|---|---|---|
| 1,058,385 | 4/1913 | Prat | 230—96 |
| 1,473,757 | 11/1923 | Dorsey | 230—112 |
| 1,481,337 | 1/1924 | Baker | 230—112X |
| 2,321,483 | 6/1943 | Haedike | 230—112X |
| 2,652,188 | 9/1953 | Cyr | 230—111X |
| 2,888,191 | 5/1959 | Neumann et al. | 230—111 |
| 3,200,764 | 8/1965 | Saunders, Jr. | 230—92X |
| 3,448,917 | 6/1969 | Dewey et al. | 230—95 |

CARLTON R. CROYLE, Primary Examiner

W. J. KRAUSS, Assistant Examiner

U.S. Cl. X.R.

417—183, 193